United States Patent Office 2,725,380
Patented Nov. 29, 1955

2,725,380

SPIRO BARBITURIC ACIDS

Arthur C. Cope, Belmont, Mass., assignor to Merck & Co., Inc., a corporation of New Jersey No Drawing. Application August 13, 1949, Serial No. 110,231

6 Claims. (Cl. 260—257)

This invention relates to new derivatives of barbituric and thiobarbituric acids. It relates more particularly to barbituric and thiobarbituric acid derivatives in which the 5-carbon atom of the barbiturate nucleus forms part of a 2-substituted alicyclic ring, and to their salts.

The compounds of this invention generically are known as spirobarbituric or spirothiobarbituric acids and are represented by the following general formulae:

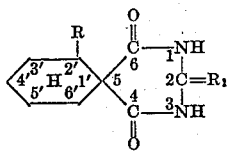

or

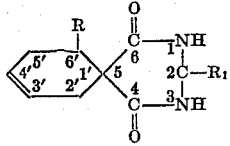

and their salts, in which R is an alkyl radical such as a saturated or unsaturated straight or branched chain lower alkyl radical and, advantageously, an alkyl radical having less than seven carbon atoms; $R_1$ represents an oxygen or a sulfur atom.

The new compounds of the present invention are pharmacologically effective compounds, having especially advantageous utility as hypnotics. Tests demonstrate that, as compared with barbituric acid compounds now widely used, these new spirobarbituric acid derivatives have a high therapeutic ratio, that is, a high ratio of narcotic activity as compared with toxicity. Among the compounds of the invention having outstanding utility are those in which R in the above formulate represents an alkyl group having from one through four carbon atoms and especially those having a three carbon alkyl group attached at this position, such as the 6'-isopropylspiro(barbituric acid-5,1'-3'-cyclohexane).
6'-n-propylspiro(barbituric acid-5,1'-3'-cyclohexane).
2'-isopropylspiro(barbituric acid-5,1'-cyclohexane).
2'-n-propylspiro(barbituric acid-5,1'cyclohexane).

The intermediate esters required for the synthesis of spirobarbituric acids are prepared by known methods, such as set forth in U. S. Patent No. 2,264,354, which issued on December 2, 1941. The method described in this patent comprises the addition of butadiene to dialkyl alkylidenemalonates having the general formula

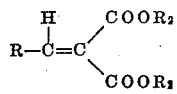

wherein R is an alkyl radical of the same type as described above for R, and $R_2$ is any suitable alkyl radical, preferably by heating the reactants to between about 170 and 180° C., although the reaction may be conducted at a lower or higher temperature depending upon the nature of the reactants and the reaction conditions. Similar adducts may be prepared by reacting, e. g. 2,3-dimethyl-1,3-butadiene and cyclopentadiene with dialkyl alkylidenemalonate. In either event, if desired the dialkyl 6-alkyl-3-cyclohexene-1,1-dicarboxylate thus formed may be catalytically hydrogenated, advantageously in the presence of Adams platinum catalyst, to form the corresponding saturated esters.

The intermediate esters may also be prepared by heating together the appropriate aldehyde, dialkyl malonate, acetic anhydride and butadiene to form dialkyl 6-alkyl-3-cyclohexene-1,1-dicarboxylate. The end product is obtained in a yield equivalent to that obtained when the condensation and diene addition reactions are carried out separately.

The condensation of either the unsaturated esters or the saturated esters with urea or thiourea produces, respectively, 6'-alkylspiro(barbituric acid-5,1'-3'-cyclohexene); 6'-alkyl-2-thiospiro(barbituric acid-5,1'-3'-cyclohexene); 2'alkylspiro(barbituric acid-5,1'-cyclohexane); and 2'-alkyl-2-thiospiro(barbituric acid-5,1'-cyclohexane. The thiobarbituric acids are prepared advantageously by condensing the selected dicarboxlic acid ester with thiourea, preferably in the presence of sodium isopropoxide dissolved in isopropyl alcohol.

Because of the ease with which the spirothiobarbituric acid derivatives are hydrolyzed to dicarboxylic acid, it was necessary to devise a new method for isolating these compounds. This novel method for the isolation of the spirothiobarbituric acids overcame, to a great extent, their tendency to hydrolyze, and gave a much higher yield of the desired end product than had heretofore been possible. This new method is an important feature of the invention. It consists in preparing the dry alkali metal salt, such as the dry sodium salt of the spirothiobarbituric acid derivative and adding it to an excess of a cold mineral acid, such as cold hydrochloric acid. The sodium salt of the spirothiobarbituric acid proved to be sufficiently stable in aqueous solutions for pharmacological testing.

The salts of the spirobarbituric acid derivatives of this invention may be prepared by any of the known methods for preparing salts of barbituric acid, such as, for example, any one of the methods for preparing the salts of the barbituric acids described in U. S. Patent No. 2,187,703, which issued January 16, 1940, on application Serial No. 263,807, filed March 23, 1939, by Arthur C. Cope.

The method for making the intermediate compounds used in the preparation of the new products of the invention is illustrated by the following specific examples.

Example I illustrates the condition employed for preparing the dialkyl 6-alkyl-3-cyclohexene-1,1-dicarboxylates.

*Example 1: Diethyl 6-n-propyl-3-cyclohexene-1,1-dicarboxlate.*—112.7 grams (0.53 mol.) of diethyl n-butylidenemalonate was placed in a 500 milliliter steel hydrogenation bomb which had been cooled with dry-ice. After the ester was cooled to —15° C., 115 grams (2.1 mol.) of butadiene (previously collected in a dry-ice-cooled tube from a commercial cylinder) were added. The mixture was stirred, the bomb closed, and allowed to stand until it reached room temperature. It was then heated for 12 to 14 hours at 170–180° C. without shaking and the reaction mixture thereafter removed to a flask equipped with a 20 centimeter Widmer column and distilled, yielding about 80 grams of vinylcyclohexene, collected at 42° C. at 40 mm. pressure, followed by 50 grams of recovered diethyl n-butylidenemalonate, boiling at 99–109° C. at a pressure of 3 mm. 70 grams of the crude adduct, diethyl 6-n-propyl-3-cyclohexene-1,1-dicarboxylate, was thereafter obtained, boiling at between 109–125° C. at 2.8 mm. pressure. This crude product was redistilled through the same column and yielded 52 grams of the purified adduct which boiled between 114–116° C. at 1.3 mm. pressure, and had a refractive index, $n_D^{25}$, of 1.4585, and a density, $d_4^{25}$, of 1.0215.

I, in the process described in the preceding example, the diethyl n-butylidenemalonate is replaced by any other dialkyl alkylidenemalonate, such as diethyl hexylidenemalonate or diethyl heptylidenemalonate, the corresponding dialkyl 6-alkyl-3-cyclohexene-1,1-dicarboxylate is formed, e. g. the diethyl 6-amyl-3-cyclohexene-1,1-dicarboxylate or the diethyl 6-hexyl-3-cyclohexene-1,1-dicarboxyldate. Examples of other esters prepared by this method are given in Table I.

TABLE I

*Diethyl 6-alkyl-3-cyclohexene-1,1-dicarboxylate*

| 6-Alkyl group | Boiling point, °C. | Pressure, mm. | Yield, percent | $n_D^{25}$ | $d_4^{25}$ |
| --- | --- | --- | --- | --- | --- |
| Methyl | 129–131 | 10 | 43 | 1.4570 | 1.0466 |
| Ethyl | 93–94.5 | 0.5 | 33 | 1.4590 | 1.0333 |
| Isopropyl | 107–108 | 0.95 | 7 | 1.4618 | 1.0300 |
| Isobutyl | 132–133 | 3.5 | 16 | 1.4580 | 1.0091 |

An alternate method by which the dialkyl 6-alkyl-3-cyclohexene-1,1-dicarboxylates may be prepared is illustrated by the following example:

*Example II: Diethyl 6-n-propyl-3-cyclohexene-1,1-dicarboxylate.*—80.1 grams (0.5 mol.) of diethyl malonate, 36.1 grams (0.5 mol.) of freshly distilled butyraldehyde, 51.1 grams (0.5 mol.) of acetic anhydride and 108 grams (2.0 mol.) of butadiene were mixed in a dry-ice cooled, 500 milliliter steel hydrogenation bomb. The mixture was heated at 182–195° C. for twelve and one-half hours without shaking, and the product was isolated by the method described under Example I. 32 grams of diethyl 6-n-propyl-3-cyclohexene-1,1-dicarboxylate boiling at 99–101.8° C. at a pressure of 0.8 mm. were obtained. This yield was equivalent to the yield obtained by carrying out the condensation and addition reactions as separate preparations.

The following example illustrates the method by which the dialkyl 2-alkylcyclohexene-1,1-dicarboxylates may be converted, preferably by catalytic hydrogenation, to the corresponding saturated derivatives.

*Example III: Dialkyl 2-alkylcyclohexane-1,1-dicarboxylate.*—Approximately 50 grams of the selected unsaturated ester, prepared by the method described in Examples I or II, are dissolved in about 50 milliliters of dry ethyl acetate and hydrogenated in the presence of 0.5 grams of pre-reduced Adams platinum catalyst. Hydrogenation is carried out at room temperature at a pressure of about 25 pounds per square inch during one-half to two hours yielding the corresponding dialkyl 2-alkylcyclohexane-1,1-dicarboxylate. Examples of compounds prepared by this method are listed in Table II, together with their physical properties.

TABLE II

*Diethyl-2-alkylcyclohexane-1,1-dicarboxylate*

| 2-Alkyl Substituent | Boiling point, °C. | Mm. | Yield, percent | $n_D^{25}$ | $d_4^{25}$ |
| --- | --- | --- | --- | --- | --- |
| Methyl | 95–96 | 1 | 92 | 1.4490 | 1.0288 |
| Ethyl | 114.8–115.8 | 2.8 | 89 | 1.4516 | 1.0181 |
| n-Propyl | 94–97.5 | 0.4 | 83 | 1.4518 | 1.0063 |
| Isopropyl | 133.134.5 | 5 | 85 | 1.4556 | 1.0132 |
| Isobutyl | 123–125 | 2 | 88 | 1.4501 | 0.9929 |

The methods for preparing the new products of the invention are illustrated by the following specific examples, although it is to be understood that the invention is not limited thereto.

Examples IV describes an advantageous procedure for preparing spirobarbituric acid derivatives.

*Example IV: 2'-n-propylspiro(barbituric acid-5,1'-cyclohexane).*—14.8 grams (0.055 mol.) of diethyl 2-n-propylcyclohexane-1,1-dicarboxylate and 6.6 grams (0.11 mol.) of urea were added to sodium isopropoxide [prepared from 2.3 grams (0.1 gram atom) of sodium and 95 milliliters of dry isopropyl alcohol], and the mixture heated under reflux for fifteen hours in an oil bath at 105° C. The isopropyl alcohol was removed under reduced pressure and the solid residue cooled in an ice bath and dissolved in 100 milliliters of cold water. The solution was extracted with three 30 milliliter portions of ether and the combined extracts were washed with water. The combined water washes and aqueous solution were cooled in ice and acidified by dropwise addition of a 50% excess of 20% hydrochloric acid, with stirring. The solid spirobarbituric acid derivative was separated by filtration, washed with water, and recrystallized to constant melting point from dilute alcohol. The purified product, 2'-n-propylspiro(barbituric acid-5,1'-cyclohexane), thus obtained in a 34% yield melted at 185–185.5° C.

Other 2'-alkylspiro(barbituric acid-5,1'-cyclohexanes) as well as 6'alkylspiro(barbituric acid-5,1'-3'-cyclohexenes) may be prepared by replacing the diethyl 2-n-propylcyclohexane-1,1-dicarboxylate of Example IV by the appropriate dialkyl 2-alkylcyclohexane-1,1-dicarboxylate or the appropriate dialkyl 6-alkyl-3-cyclohexene-1,1-dicarboxylate, such as, any of the esters described in Examples I and II, and Tables I and II. Examples of other spirobarbituric acid derivatives prepared by the method of Example IV are included in the following Tables III and IV.

TABLE III

*2'-alkylspiro(barbituric acid-5,1'-cyclohexane)*

| 2'-alkyl substituent | Melting point, °C. | Yield, percent |
| --- | --- | --- |
| Methyl | 219.5–220 | 62 |
| Ethyl | 194.8–195.2 | 34 |
| Isopropyl | 196.2–196.8 | 20 |
| Isobutyl | 194.2–194.6 | 25 |

TABLE IV

*6'-alkylspiro(barbituric acid-5,1'-3'-cyclohexene)*

| 6'-alkyl substituent | Melting point, °C. | Yield, percent |
| --- | --- | --- |
| Methyl | 218.5–219 | 77 |
| Ethyl | 193.6–194.2 | 34 |
| n-Propyl | 191.5–192.5 | 68 |
| Isopropyl | 195 –197 | 25 |

The spirothiobarbituric acid derivatives of the invention advantageously may be prepared by the procedure described in Example V.

*Example V: 6'-n-propyl-2-thiospiro(barbituric acid-5,1'-3'-cyclohexene).*—24.3 grams (0.088 mol.) of diethyl 6-n-propyl-3-cyclohexene-1,1-dicarboxylate and 10.5 grams (0.14 mol.) of thiourea were added to sodium isopropoxide [prepared from 4.0 grams (0.17 gram atom) of sodium and 200 milliliters of dry isopropyl alcohol].

The mixture was heated under reflux for fifteen hours in an oil bath at approximately 105° C. After the period of reflux, the isopropyl alcohol was removed by distillation under reduced pressure, leaving a crude solid mixture containing the sodium salt of 6'-n-propyl-2-thiospiro(barbituric acid-5,1'-3'-cyclohexene). This solid was washed with ether, collected on a filter, and added in portions, with stirring, to 250 milliliters of 20% hydrochloric acid cooled in an ice bath. The solid product was separated by filtration and recrystallized to constant melting point from dilute alcohol. The purified 6'-n-propyl-2-thiospiro(barbituric acid-5,1'-3'-cyclohexene) was obtained in a 40% yield, and had a melting point of 143.2–143.8° C.

Any other desired 6'-alkyl-2-thiospiro(barbituric acid-5,1'-3'-cyclohexene), as well as any 2'-alkyl-2-thiospiro- (barbituric acid-5,1'-cyclohexane) may be prepared by the same method as described in Example V. Examples of compounds prepared by this method are given in Tables V and VI.

TABLE V

6'-alkyl-2-thiospiro(barbituric acid-5,1'-3'-cyclohexene)

| 6'-alkyl substituent | Melting point, °C. | Yield, percent |
|---|---|---|
| Methyl | 175 –176 | 57 |
| Ethyl | 129.2–129.4 | 13 |

TABLE VI

2'-alkyl-2-thiospiro(barbituric acid-5,1'-cyclohexane)

| 2'-alkyl substituent | Melting point, °C. | Yield, percent |
|---|---|---|
| Methyl | 172 –172.5 | 43 |
| Ethyl | 158.4–159.2 | 20 |
| n-Propyl | 150.2–151.0 | 35 |

While in the foregoing examples, certain specific intermediates were used to prepare certain specific end products, such as in the preparation of the dicarboxylic acid esters and the spirobarbituric acid derivatives and the spirothiobarbituric acid derivatives of the invention prepared from these esters, any other desired reactant may be used in place of any one of those specifically recited in the examples to give corresponding esters or corresponding spirobarbituric acid derivatives or spirothiobarbituric acid derivatives of the type hereinabove described.

While the invention has been illustrated by certain individual specific embodiments of it, it is understood that variations, substitutions and modifications may be made to the extent of the scope of the appending claims.

I claim:

1. Spiro derivatives of barbituric and thiobarbituric acids selected from the class consisting of compounds having the general formulae

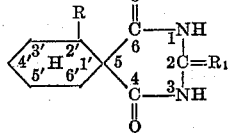

and

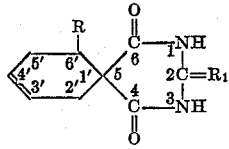

and their non-toxic, anionic salts, in which R is a lower alkyl radical having from one through six carbon atoms; and $R_1$ is selected from the class consisting of oxygen and sulfur.

2. 2'-propylspiro(barbituric acid-5,1'-cyclohexane).
3. 6'-propylspiro(barbituric acid-5,1'-3-cyclohexane).
4. 2' - iso - butylspiro(barbituric acid - 5,1' - cyclo - hexane).
5. 2'-ethylspiro(barbituric acid-5,1'-cyclohexane).
6. 2'-methylspiro(barbituric acid-5,1'-cyclohexane).

References Cited in the file of this patent

Gallagher: The Action of Alkali on Cyclohexenecarbonals, 1,1-dicarboxylates and Spiro-barbiturates, Thesis (Ph. D.) U. of Mo. (1942), pp. 17, 47, 48, 50 and 51.

Chem. Abst., Fourth Decennial subject index, p. 5401, refers to Chem. Abst., 37, 1997₃, (1943) which cites Dudley M. Gallagher, Univ. Microfilm (Ann Arbor, Mich.) Pub. No. 463, 67 pp.